(12) United States Patent
Ahokas et al.

(10) Patent No.: US 10,685,274 B2
(45) Date of Patent: Jun. 16, 2020

(54) RFID TRANSPONDER WEB

(71) Applicant: Confidex OY, Tampere (FI)

(72) Inventors: Heikki Ahokas, Tampere (FI); Miika Pylvanainen, Ylojarvi (FI)

(73) Assignee: Confidex OY, Tampere (FI)

( * ) Notice: Subject to any disclaimer, the term of this patent is extended or adjusted under 35 U.S.C. 154(b) by 131 days.

(21) Appl. No.: 15/818,018

(22) Filed: Nov. 20, 2017

(65) Prior Publication Data

US 2018/0150737 A1    May 31, 2018

(30) Foreign Application Priority Data

Nov. 25, 2016 (EP) ..................................... 16200610

(51) Int. Cl.
*G06K 19/077*    (2006.01)

(52) U.S. Cl.
CPC ... *G06K 19/07728* (2013.01); *G06K 19/0776* (2013.01); *G06K 19/07749* (2013.01)

(58) Field of Classification Search
CPC ....... G06K 19/07728; G06K 19/07749; G06K 19/0776
USPC .......................................................... 235/492
See application file for complete search history.

(56) References Cited

U.S. PATENT DOCUMENTS

| | | | | |
|---|---|---|---|---|
| 10,068,499 | B2 * | 9/2018 | Oster | ..................... G09F 3/0295 |
| 2007/0283556 | A1 * | 12/2007 | Wehr | ............... G06K 19/07718 |
| | | | | 29/600 |
| 2008/0213525 | A1 | 9/2008 | Ritamaki et al. | |
| 2010/0253523 | A1 * | 10/2010 | Bouchard | .............. G06K 19/02 |
| | | | | 340/572.8 |
| 2017/0316299 | A1 * | 11/2017 | Ritamaki | ......... G06K 19/07718 |

FOREIGN PATENT DOCUMENTS

| | | |
|---|---|---|
| WO | 2007110254 A1 | 10/2007 |
| WO | 2016089409 A1 | 6/2016 |

OTHER PUBLICATIONS

Extended European Search Report issued in EP Application No. EP16200610.0 dated May 15, 2017.

* cited by examiner

*Primary Examiner* — Paultep Savusdiphol
(74) *Attorney, Agent, or Firm* — Jeffrey T. Placker; Holland & Knight LLP (57) ABSTRACT

An RFID transponder web, comprising a support substrate, and a series of the RFID transponders arranged on said support substrate such that there is a distance (D) between two successive RFID transponders. The transponder(s) have a transponder thickness (T). The RFID transponder web further comprises a spacer arranged on the support substrate, at least on the section of the support substrate that lies between the successive RFID transponders and extends from a first edge of the support substrate to another edge of said support substrate. A through cut is arranged between the spacer and the next RFID transponder, or between two spacer parts. The through cut allows the spacer to be bent away from said next RFID transponder, or to bent away said two spacer parts from each other. Alternatively, the support substrate is made of a flexible and elastic material.

13 Claims, 6 Drawing Sheets

RFID TRANSPONDER WEB

RELATED APPLICATIONS

The subject application claims the benefit of European Patent Application No. 16200610.0, filed on Nov. 25, 2016. The content of which is herein incorporated by reference in its entirety.

BACKGROUND

The invention relates to an RFID transponder web.

It is known to produce, store and dispense RFID transponders or RFID labels in RFID transponder webs.

However, an effective and compact packing of transponders is difficult or even impossible when there is a need for smooth printing without any gaps in label web.

When packing labels on reel the quantity of reel is small and big labels close to the core will get wrinkled.

Furthermore, labels intended to be printed cannot be delivered as packed in fan-folded manner, because those labels near folds will get wrinkled.

BRIEF DESCRIPTION

Viewed from a first aspect, there can be provided an RFID transponder web, comprising a support substrate, and a series of the RFID transponders arranged on said support substrate such that there is a distance between two successive RFID transponders, the transponder(s) having a transponder thickness, the RFID transponder web further comprising a spacer arranged on the support substrate, at least on the section of the support substrate that lies between the successive RFID transponders and extends from a first edge of the support substrate to another edge of said support substrate, the spacer having a spacer thickness, wherein a through cut is arranged between the spacer and the next RFID transponder, or between two spacer parts, the through cut allowing the spacer to be bent away from said next RFID transponder, or to bent away said two spacer parts from each other.

Thereby an RFID transponder web which can be fan-folded or reeled on small core without risk the transponders getting wrinkle may be achieved.

Viewed from a second aspect, there can be provided an RFID transponder web, An RFID transponder web, comprising a support substrate, and a series of the RFID transponders arranged on said support substrate such that there is a distance between two successive RFID transponders, the transponder(s) having a transponder thickness, the RFID transponder web further comprising a spacer arranged on the support substrate, at least on the section of the support substrate that lies between the successive RFID transponders and extends from a first edge of the support substrate to another edge of said support substrate, the spacer having a spacer thickness, wherein the support substrate is made of a flexible and elastic material.

Thereby an RFID transponder web which can be fan-folded or reeled on small core without risk the transponders getting wrinkle may be achieved.

The RFID transponder webs are characterised by what is stated in the characterising parts of the independent claims. Some other embodiments are characterised by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit sub-tasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

In one embodiment, the spacer is arranged between two RFID transponders.

In one embodiment, the spacer is arranged at the edge of the support substrate, next to a gap between two successive RFID transponders.

In one embodiment, the RFID transponder web comprises spacers at both edges of the support substrate.

In one embodiment, the spacer is integrated with the RFID transponder.

In one embodiment, the integrated spacer comprises at least one extension being arranged to penetrate a distance in the next RFID transponder, and the through cut is arranged between said extension and said next RFID transponder.

In one embodiment, the through cut is straight.

In one embodiment, the through cut comprises at least one bend so that the through cut has projections both in the longitudinal and the transversal direction of the transponder web.

In one embodiment, the through cut extends also through the support substrate.

In one embodiment, the through cut has been made by removing material.

In one embodiment, the through cut has been made without removing material.

In one embodiment, the through cut is continuous from its first end to its second end.

In one embodiment, the through cut comprises a perforated line.

In an embodiment, the support substrate is made of a flexible and elastic material, and a through cut is arranged between the spacer and the next RFID transponder, or between two spacer parts.

BRIEF DESCRIPTION OF FIGURES

Some embodiments illustrating the present disclosure are described in more detail in the attached drawings, in which.

In the figures, some embodiments are shown simplified for the sake of clarity. Similar parts are marked with the same reference numbers in the figures.

DETAILED DESCRIPTION

Figure 1:
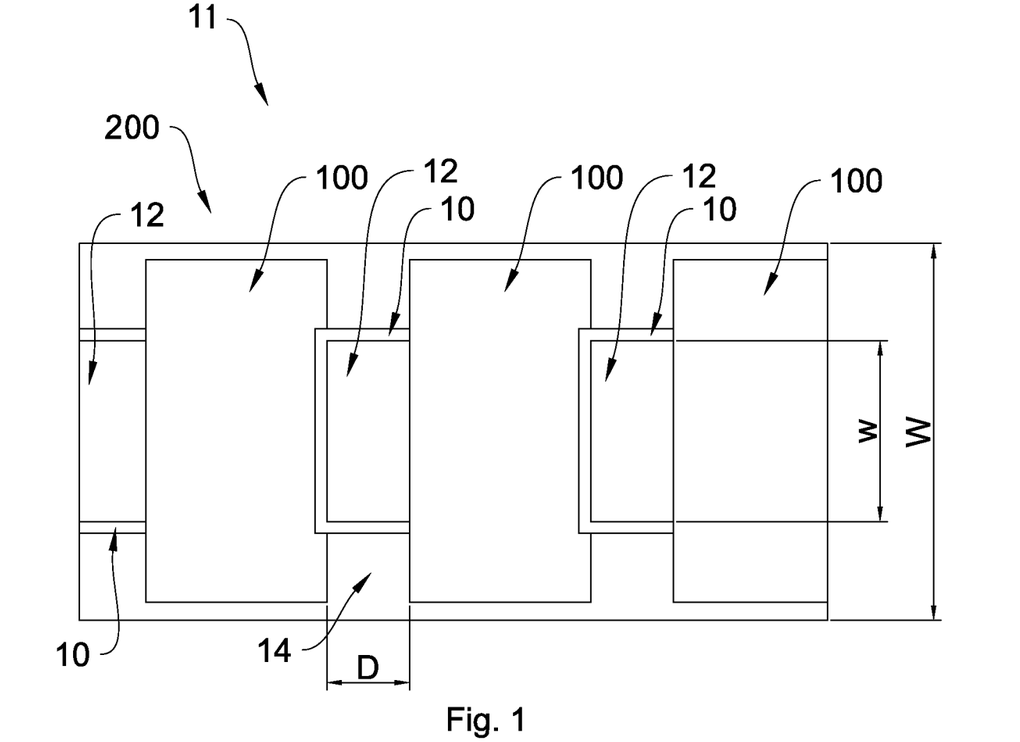
FIG. 1 is a schematic top view of an RFID label web.
Figure 2:
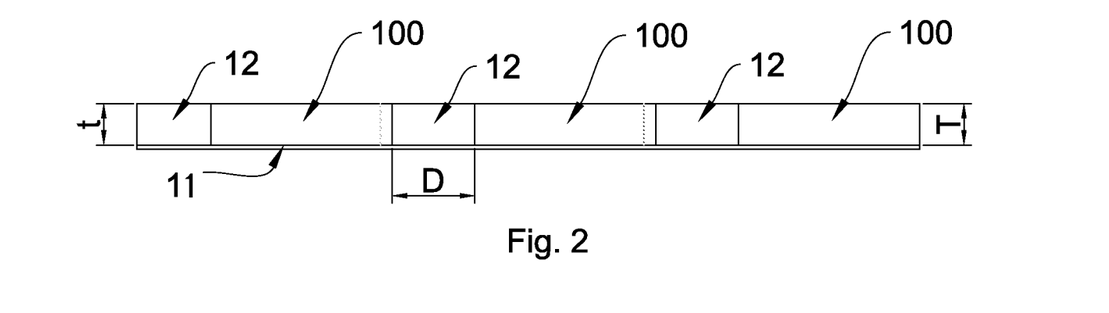
FIG. 2 is a schematic side view of the RFID label web shown in FIG. 1.
Figure 3:
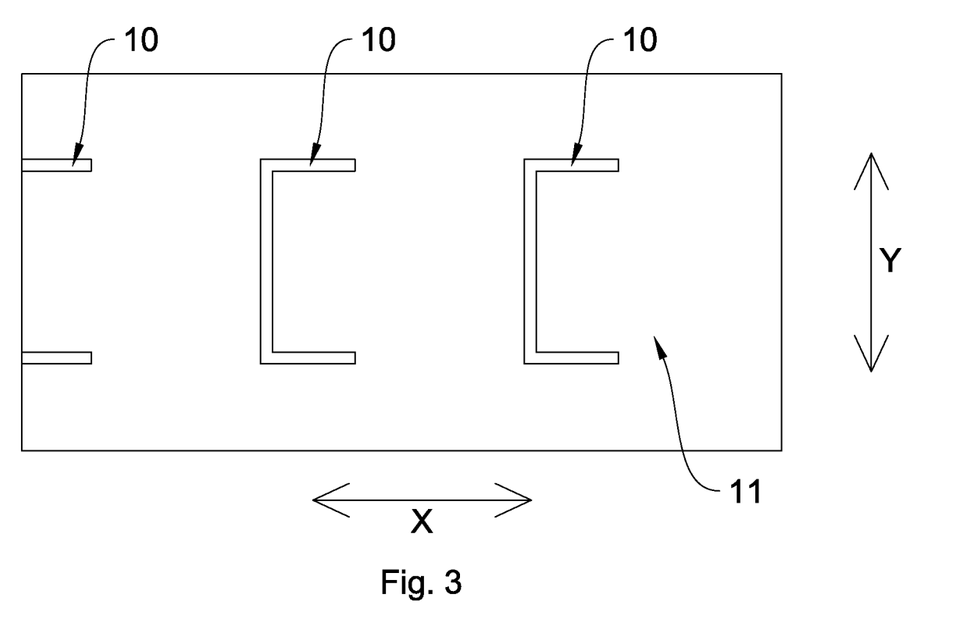
FIG. 3 is a schematic bottom view of the RFID label web shown in FIG. 1.

FIG. 1 is a schematic top view of an RFID label web, FIG. 2 is a schematic side view of the RFID label web shown in FIG. 1, and FIG. 3 is a schematic bottom view of the RFID label web shown in FIG. 1.

The RFID transponder web 200, comprises a support substrate 11 and a series of the RFID transponders 100 arranged on the support substrate 11 such that there is a distance D between two successive RFID transponders 100.

The RFID transponder 100 may comprise a printable surface or face element, an antenna element, an IC, and an impedance matching element, and a ground plane (not shown). Said layers are typically attached together with suitable adhesive layers and sealed by e.g. a silicone liner. The antenna element and the IC, together with further electronic components, if any, may be arranged to a structural module such as an inlay comprising a dielectric substrate (not shown).

In order to obtain RFID printer-encoder compatibility, the RFID transponder 100 has to be thin. Most RFID printer-encoders will work with RFID transponders 100 which are less than 1 mm thick. This applies also to RFID encoders, i.e. devices that are used to encode RFID transponders but which do not have printing means, and also to RFID printers, i.e. devices that are able to print RFID transponders but which do not have encoding means.

The transponders have a transponder thickness T. The thickness T of the RFID transponder 100 causes challenges for printer head, because due to the distance D there is a gap 14 between two successive RFID transponders 100. The gap 14 causes significant load for the printer head of RFID printer-encoders. To overcome this issue, the RFID transponder web 200 comprises a spacer 12 arranged on the support substrate 11, at least on the section of the support substrate 11 that lies between the successive RFID transponders 100 and extends from a first edge of the support substrate 11 to another edge of the support substrate 11.

The spacer has a spacer thickness t. In an embodiment, the spacer thickness is equal or at least essentially equal with the transponder thickness T. The "essentially equal" means here that $0.5 \times T \le t \le T$. In another embodiment, the spacer thickness t is less than half of T, i.e. $t < 0.5 \times T$.

In an embodiment, the spacer thickness t is constant all over the spacer 12 in the longitudinal direction X of the transponder web 200. In another embodiment, the spacer thickness t changes in said direction X. For instance, the thickness t may have its maximum at its edge next to at least one of the RFID transponders 100, whereas the spacer has its minimum thickness approximately in the middle of the spacer 12. The thickness t changes preferably smoothly from its maximum to minimum.

The spacer 12 reduces significantly the stresses of the printer head of RFID printer-encoders, RFID encoders, and RFID printers.

The spacer 12 may be manufactured e.g. from a material of a lamination process that normally would be removed from the transponder web 200. In other words, a piece of so called "waste material" is not removed but left between the RFID transponders 100. The spacer 12 may have any suitable shape.

The spacer 12 is designed such a way that sensors of the RFID printer-encoders are able to detect the edges of the RFID transponders 100. According to an idea, the detection is based on a feature where the width w of the spacer 12 is less than the width W of the RFID transponder 100. The sensor types are typically capacitive or optical sensors.

However, in another embodiments, the width w of the spacer 12 is equal with or more than the width W of the RFID transponder 100.

In an embodiment, the spacers 12 may be detached from the encoded RFID transponders 100.

The RFID transponder web 200 further comprises a through cut 10 that is arranged between the spacer 12 and the next RFID transponder 100.

The through cut 10 allows or at least eases the spacer 12 to be bent away from said next RFID transponder 100, which in turn makes it possible to fan-fold the RFID transponder web 200 or to reel the web 200 on small core without risk the transponders 100 getting wrinkled.

According to an aspect, the through cut 10 comprises at least one bend so that the through cut 10 has projections both in the longitudinal X and the transversal direction Y of the transponder web 200. In the embodiment shown in FIGS. 1-3, the through cut 10 has two right-angle bends. However, it is to be noted that the through cut 10 may also be straight without any bends, or curved.

In the embodiment shown in FIGS. 1-3, the through cut 10 extends also through the support substrate 11. An advantage is that the RFID transponder web 200 has capacity to be even more easily bent.

In an embodiment, the through cut 10 has been made by removing e.g. thin battens of material. In another embodiment, the through cut 10 has been made without removing material.

The through cut 10 may be continuous from its first end to its second end, as shown in FIG. 1, or it may comprise a perforated line.

The through cut 10 can be made by e.g. a suitable blade, die, puncher, laser, abrasive water jet etc.

Figure 4:
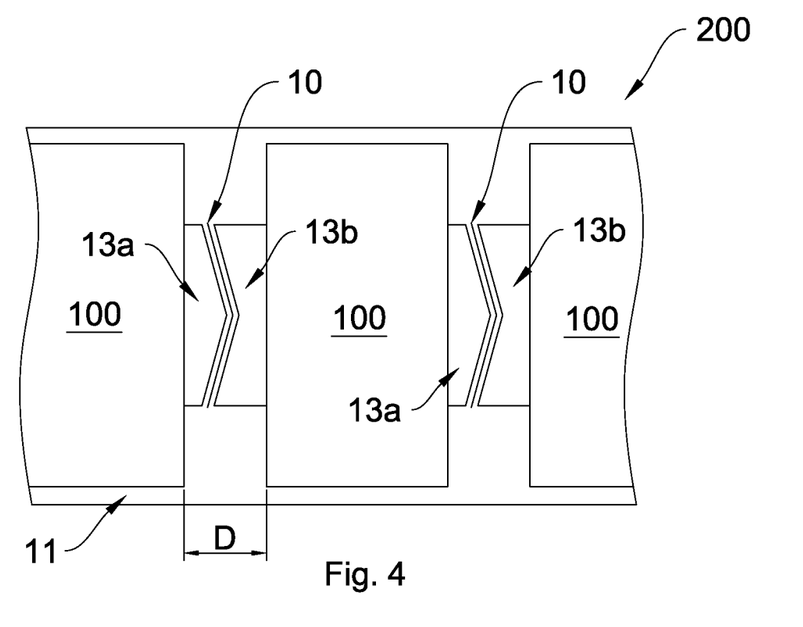
FIG. 4 is a schematic top view of another RFID label web.

FIG. 4 is a schematic top view of another RFID label web. According to an aspect, the through cut 10 is arranged between two spacer parts 13a, 13b. An advantage is that the cut may not have any influence on the shape of the RFID label.

In the embodiment shown in FIG. 4, the shape of the through cut 10 is a herringbone that includes one bend in the middle of the cut 10 so that the through cut 10 is a symmetrical cut. Through cuts 10 comprising one bend only may be designed differently, e.g. arranging the bend asymmetrically.

The width w of the spacer 12 may also be equal with or more than the width W of the RFID transponder 100.

Figure 5:
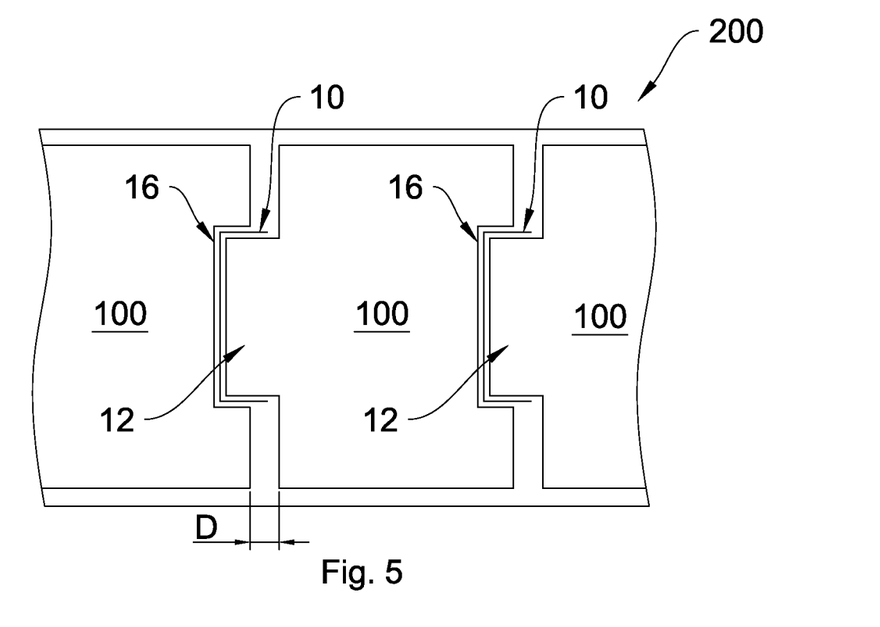
FIG. 5 is a schematic top view of third RFID label web.

FIG. 5 is a schematic top view of third RFID label web. According to an aspect, the spacer 12 is integrated with the RFID transponder 100.

In the embodiment shown in FIG. 5, the integrated spacer 12 comprises at least one extension 15 that penetrates a distance d in the next RFID transponder 100. Said next RFID transponder 100 comprises an offset 16 for receiving the extension 15.

In another embodiment, the extension 15 is arranged asymmetrically in the RFID transponder 100. For example, the extension 15 of a first transponder may be positioned on one half (e.g. upper half in FIG. 5) of the long edge of the transponder, whereas the extension 15 of the next transponder 100 is positioned on another half (i.e. lower half in FIG. 5) of the long edge of the next transponder opposite to the first transponder.

An advantage of the embodiment comprising the integrated extension is that when dispensed from a label applicator, the extension 15 will be removed together with the RFID transponder 100 from the web 200. This feature may prevent malfunction of the applicator.

Figure 6:
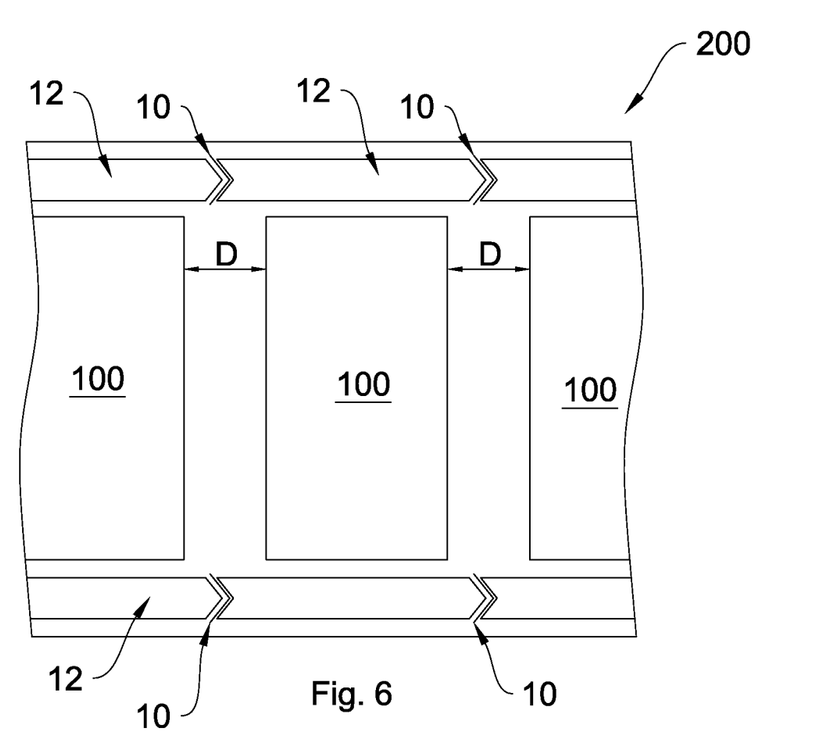
FIG. 6 is a schematic top view of fourth RFID label web.

FIG. 6 is a schematic top view of fourth RFID label web. According to an aspect, the spacer 12 is arranged at the edge of the support substrate 11, next to the gap 14 between two successive RFID transponders 6. The spacer 12 may be continuous over the whole length of the support substrate 11, i.e. also next to the RFID transponders 6.

In the embodiment shown in FIG. 6, there are spacers 12 at both edges of the support substrate 11. In another embodiment, there is only one spacer 12 arranged on one edge of the support substrate 11.

An advantage is that the spacers 12 and the cut 10 do not have any influence on the appearance of the RFID transponders 100. Another advantage is that the RFID transponder web 200 may have a well-balanced structure in the sense of statics and dynamics because the "thick" elements of the web 200 extend from one edge to another edge of the web.

According to a second aspect of the invention, there can be provided an RFID transponder web 200, comprising a support substrate 11, and a series of the RFID transponders 100 arranged on said support substrate 11 such that there is a distance D between two successive RFID transponders 6, the transponder(s) 100 having a transponder thickness T. The RFID transponder web 200 further comprises a spacer 12 arranged on the support substrate 11, at least on the section of the support substrate 11 that lies between the successive RFID transponders 100 and extends from a first edge of the support substrate 11 to another edge of said support substrate 11. The spacer 12 has a spacer thickness t, and the transponder thickness T and the spacer thickness t being equal or at least essentially equal. According to this aspect, the support substrate 11 is made of a flexible and elastic material.

The flexible and elastic substrate 11 allows or at least eases the spacer 12 to be bent away from said next RFID transponder 100, which in turn makes it possible to fan-fold the RFID transponder web 200 or to reel the web 200 on small core without risk the transponders 100 getting wrinkled.

There is a through cut 10 is arranged between the spacer 12 and the next RFID transponder 100, or between two spacer parts 13a, 13b, as disclosed above in connection with any of the FIGS. 1-6.

An advantage is that the RFID transponder web 200 may be packed on a reel or in fan-folded manner.

The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The drawings and the related description are only intended to illustrate the idea of the invention. The invention may vary in detail within the scope of the inventive idea defined in the following claims.

REFERENCE SYMBOLS 10 through cut
11 support substrate
12 spacer
13a, b spacer part
14 gap
15 extension
16 offset
100 RFID transponder
200 RFID transponder web
D distance
d distance
T transponder thickness
t spacer thickness
W width of the RFID transponder
w width of the spacer
X longitudinal direction
Y transversal direction

The invention claimed is:

1. An RFID transponder web, comprising
   a support substrate, and
   a series of the RFID transponders arranged on said support substrate such that there is a distance between two successive RFID transponders,
   the transponder(s) having a transponder thickness,
   the RFID transponder web further comprising
      a spacer arranged on the support substrate, at least on the section of the support substrate that lies between the successive RFID transponders and extends from a first edge of the support substrate to another edge of said support substrate,
      the spacer having a spacer thickness, wherein a through cut is arranged between the spacer and the next RFID transponder, or between two spacer parts,
      the through cut being continuous from its first end to its second end in such a manner that the through cut allows the spacer to be bent away from said next RFID transponder, or to bent away said two spacer parts from each other.

2. The RFID transponder web as claimed in claim 1, wherein the spacer is arranged between two RFID transponders.

3. The RFID transponder web as claimed in claim 1, wherein the spacer is arranged at the edge of the support substrate, next to a gap between two successive RFID transponders.

4. The RFID transponder web as claimed in claim 3, comprising spacers at both edges of the support substrate.

5. The RFID transponder web as claimed in claim 1, wherein the spacer is integrated with the RFID transponder.

6. The RFID transponder web as claimed in claim 5, wherein the integrated spacer comprises at least one extension being arranged to penetrate a distance in the next RFID transponder, and wherein
   the through cut is arranged between said extension and said next RFID transponder.

7. The RFID transponder web as claimed in claim 1, wherein the through cut is straight.

8. The RFID transponder web as claimed in claim 1, wherein the through cut comprises at least one bend so that the through cut has projections both in the longitudinal and the transversal direction of the transponder web.

9. The RFID transponder web as claimed in claim 1, wherein the through cut extends also through the support substrate.

10. The RFID transponder web as claimed in claim 1, wherein the through cut has been made by removing material.

11. The RFID transponder web as claimed in claim 1, wherein the through cut has been made without removing material.

12. An RFID transponder web, comprising
   a support substrate, and
   a series of the RFID transponders arranged on said support substrate such that there is a distance between two successive RFID transponders,
   the transponder(s) having a transponder thickness,
   the RFID transponder web further comprising
      a spacer arranged on the support substrate, at least on the section of the support substrate that lies between the successive RFID transponders and extends from a first edge of the support substrate to another edge of said support substrate, the spacer having a spacer thickness, wherein the support substrate is made of a flexible and elastic material.

13. The RFID transponder web as claimed in claim 12, wherein a through cut is arranged between the spacer and the next RFID transponder, or between two spacer parts.

* * * * *